(12) United States Patent
Lau et al.

(10) Patent No.: US 8,723,913 B2
(45) Date of Patent: May 13, 2014

(54) RATE ADAPTATION FOR VIDEO CALLING

(75) Inventors: Kevin Lau, Issaquah, WA (US); Ahmad Arash Obaidi, Bellevue, WA (US)

(73) Assignee: T-Mobile USA, Inc., Bellevue, WA (US)

(*) Notice: Subject to any disclaimer, the term of this patent is extended or adjusted under 35 U.S.C. 154(b) by 308 days.

(21) Appl. No.: 13/189,281

(22) Filed: Jul. 22, 2011

(65) Prior Publication Data

US 2012/0086767 A1    Apr. 12, 2012

Related U.S. Application Data

(60) Provisional application No. 61/390,974, filed on Oct. 7, 2010.

(51) Int. Cl.
*H04N 7/14* (2006.01)

(52) U.S. Cl.
CPC ........................................ *H04N 7/14* (2013.01)
USPC .................. 348/14.02; 348/14.01; 348/14.12

(58) Field of Classification Search
USPC ......... 348/14.01–14.16; 370/468; 375/240.02
See application file for complete search history.

(56) References Cited

U.S. PATENT DOCUMENTS

| | | | |
|---|---|---|---|
| 6,731,325 B1 | 5/2004 | Qi et al. | |
| 7,072,678 B2 | 7/2006 | Allison | |
| 7,103,669 B2 | 9/2006 | Apostolopoulos | |
| 7,171,460 B2 | 1/2007 | Kalavade et al. | |
| 7,418,497 B2 | 8/2008 | Hagale et al. | |
| 7,689,650 B1 | 3/2010 | Sanghavi et al. | |
| 7,701,925 B1 | 4/2010 | Mason et al. | |
| 7,787,445 B2 | 8/2010 | Marsico | |
| 7,899,862 B2 | 3/2011 | Appelman et al. | |
| 8,115,797 B2* | 2/2012 | Whited et al. ............. | 348/14.01 |
| 8,370,432 B2 | 2/2013 | Digate et al. | |
| 2004/0186887 A1 | 9/2004 | Galli et al. | |
| 2004/0207508 A1 | 10/2004 | Lin et al. | |
| 2005/0108417 A1 | 5/2005 | Haumont | |
| 2005/0259601 A1 | 11/2005 | Rosenberg et al. | |
| 2006/0023729 A1 | 2/2006 | Choi et al. | |

(Continued)

FOREIGN PATENT DOCUMENTS

| | | |
|---|---|---|
| WO | WO2005055504 A1 | 6/2005 |
| WO | WO2006012911 A1 | 2/2006 |

(Continued)

OTHER PUBLICATIONS

PCT Search Report and Written Opinion mailed May 4, 2012 for PCT Application No. PCT/US11/54785, 9 pages.

(Continued)

*Primary Examiner* — Melur Ramakrishnaiah
(74) *Attorney, Agent, or Firm* — Lee & Hayes, PLLC

(57) ABSTRACT

Telecommunication devices are described herein that are configured to establish a video call and adapt frame rates at which video and audio frames of the video call are transmitted. The telecommunication devices adapt frame rates based at least on uplink and downlink link qualities of each telecommunication device. By adapting the frame rates, the telecommunication devices engage in a real-time exchange of the video and audio frames of the video call. A server is also described herein that is configured to conditionally establish a video call between telecommunication devices, to determine link qualities of the telecommunication devices, and to adapt frame rates based at least on the link qualities.

18 Claims, 5 Drawing Sheets

(56) References Cited

U.S. PATENT DOCUMENTS

| | | |
|---|---|---|
| 2007/0156924 A1 | 7/2007 | Ramalingam et al. |
| 2008/0043644 A1 | 2/2008 | Barkley et al. |
| 2008/0137541 A1 | 6/2008 | Agarwal et al. |
| 2008/0244019 A1 | 10/2008 | Mellor et al. |
| 2008/0267069 A1 | 10/2008 | Thielman et al. |
| 2009/0005037 A1 | 1/2009 | Noldus et al. |
| 2009/0034610 A1 | 2/2009 | Lee et al. |
| 2009/0116458 A1 | 5/2009 | Ramesh et al. |
| 2010/0034106 A1 | 2/2010 | Hu et al. |
| 2010/0040347 A1 | 2/2010 | Kent, Jr. et al. |
| 2010/0272101 A1 | 10/2010 | Ku et al. |
| 2010/0316066 A1 * | 12/2010 | Leung .................. 370/468 |
| 2011/0025820 A1 | 2/2011 | Fisher et al. |
| 2011/0249086 A1 * | 10/2011 | Guo et al. .................. 348/14.12 |
| 2011/0250869 A1 | 10/2011 | Mahajan |
| 2012/0079016 A1 | 3/2012 | Hung et al. |

FOREIGN PATENT DOCUMENTS

| | | |
|---|---|---|
| WO | WO2007016472 A2 | 2/2007 |
| WO | WO2008070869 A2 | 6/2008 |
| WO | WO2010052570 A1 | 5/2010 |

OTHER PUBLICATIONS

PCT Search Report and Written Opinion mailed Mar. 29, 2013 for PCT Application No. PCT/US12/61608, 11 pages.

Office Action for U.S. Appl. No. 13/211,155, mailed on Dec. 30, 2013, Kevin Lau, "Video Presence Sharing", 11 pages.

* cited by examiner

RATE ADAPTATION FOR VIDEO CALLING

RELATED APPLICATIONS

This U.S. patent application claims priority to provisional U.S. patent application No. 61/390,974, entitled "Real-Time Conversations Through Video Calling," and filed on Oct. 7, 2010. Provisional U.S. patent application No. 61/390,974 is incorporated herein in its entirety by this reference.

BACKGROUND

In recent years, telecommunications have advanced from wired calling to wireless calling and from circuit-switched networks to packet-switched networks. In addition to voice calling, telecommunications devices now allow a range of communications, from emails to text messages, support numerous applications, and provide many data services, including Internet browsing and video streaming. Internet browsing and video streaming enable a telecommunication device user to view a streamed video clip from an Internet web site on her telecommunication device. Convergences of these technologies and others have resulted in support for video calling by telecommunication devices and their associated service providers. Video calling provides real-time video of the conversation partner to accompany the real-time audio exchanged in any voice or video call.

Existing technologies for streaming video to telecommunication devices do not work well given the real-time requirements of video calls. In streaming a video from a website, a buffer of received content is built on the receiving device in order to make fluctuations in network bandwidth opaque to the telecommunication device user. Because a buffer of content is available for use in playback when a network connection is interrupted or congested, playback appears to continue without interruption to the telecommunication device user. While such continuous playback is important in a video call, the delay required by any meaningful buffering does not work with real-time conversations. Received video and audio must appear to be played to the user as they are received for the communication to have the real-time qualities traditionally associated with voice calls. Without the use of meaningful buffering, however, transmission of video and audio frames of a video call over a network subject to interruptions, congestion, and differing qualities and types of coverage may result in quite noticeable glitches in the video call in the form of pausing and dropped video and audio frames.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

DETAILED DESCRIPTION

Described herein are techniques for adapting frame rates of telecommunication devices engaged in real-time video calls based at least on uplink and downlink link qualities of the telecommunication devices. Each telecommunication device may adapt the frame rate at which it transmits video and audio frames of a video call based at least on the uplink link quality and request that its conversion partner adapt its frame rate based on the downlink link quality. In some embodiments, the link quality determination and rate adaptation may be performed at least in part by a server, such as a server of a telecommunications service provider.

Example Environment

Figure 1:
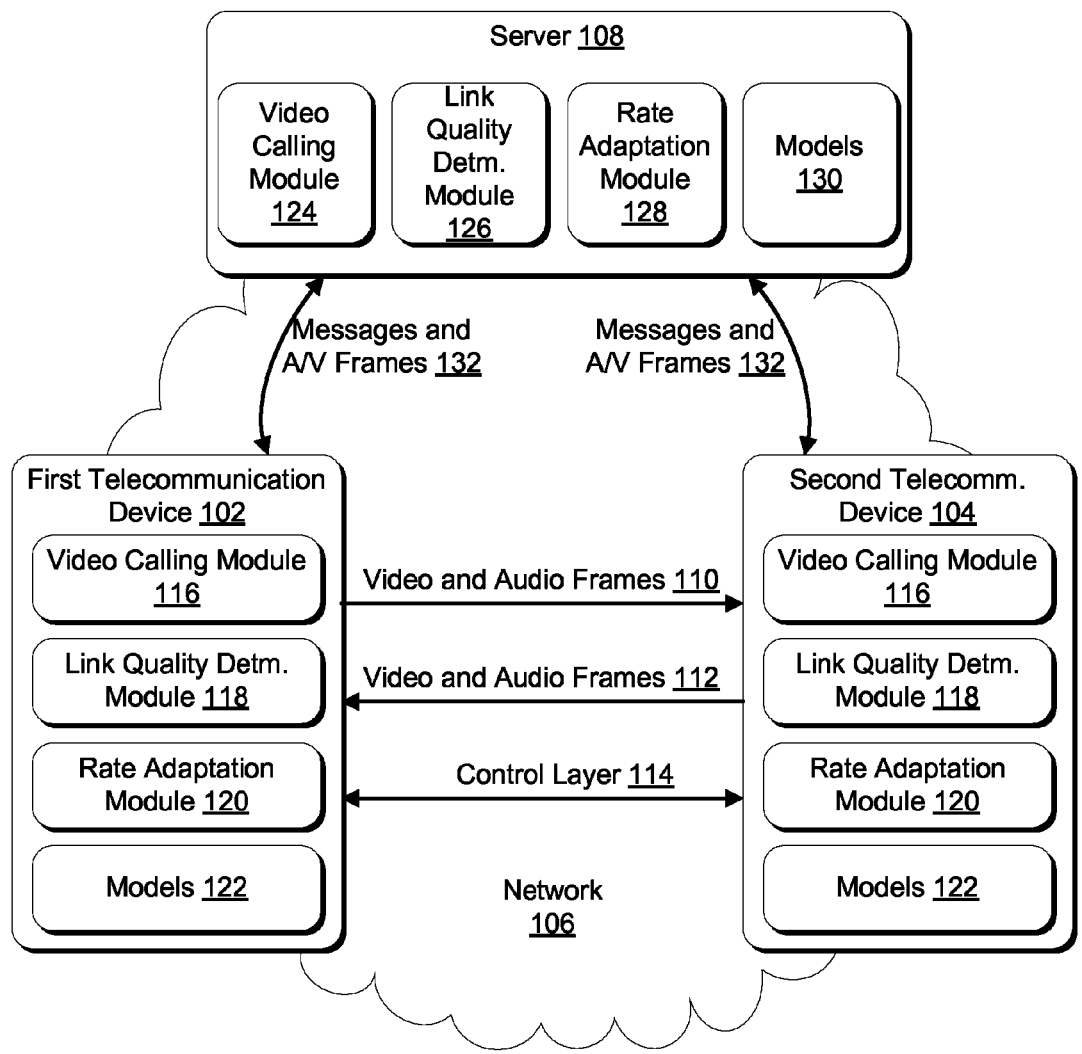
FIG. 1 illustrates an example environment, including multiple telecommunication devices engaging in a video call and a server facilitating the video call, in accordance with various embodiments.

FIG. 1 illustrates an example environment, including multiple telecommunication devices engaging in a video call and a server facilitating the video call, in accordance with various embodiments. As shown in FIG. 1, a first telecommunication device 102 may engage in a video call with a second telecommunication device 104 over a network 106. In some embodiments, a server 108 of a telecommunication service provider may participate in establishing the video call. The video call may involve the exchange of video and audio, with the first telecommunication device 102 transmitting video and audio frames 110 at a first frame rate and the second telecommunication device 104 transmitting video and audio frames 112 at a second frame rate. The first telecommunication device 102 and second telecommunication device 104 may also exchange signaling messages using a control layer 114.

Each of the first telecommunication device 102 and second telecommunication device 104 may include a video calling module 116 for establishing video calls and exchanging video and audio frames 110/112, a link quality determination module 118 for determining uplink and downlink link qualities, a rate adaptation module 120 for adapting the first and second frame rates based on the uplink and downlink link qualities, and models 122 for use in predicting uplink and downlink link qualities.

In some embodiments, the server 108 may also include a video calling module 124, a link quality determination module 126, a rate adaptation module 128, and models 130. The server 108 may communicate with the telecommunication devices 102 and 104 through signaling messages 132 to effect the establishment of video calls and the adaptations of frame rates and may provide video and audio frames 132 from each of the telecommunication devices 102/104 to the other.

In various embodiments, the first telecommunication device 102 and second telecommunication device 104 may each be any sort of telecommunication device, such as a smart phone, a cellular phone, a personal digital assistant (PDA), a personal computer (PC), a laptop, a desktop, a workstation, a media player, a gaming device, a television, a media center, or the like. To enable video calling, each of the first telecommunication device 102 and second telecommunication device 104 may be equipped with a front-facing camera (i.e., a camera on the same surface of the telecommunication device 102/104 as the display) or have a port capable of connecting to a peripheral camera. Also, as mentioned above and described in further detail herein, each telecommunication device 102/104 may be configured with a video calling module 116, a link quality determination module 118, a rate adaptation module 120, and models 122. An example telecommunication device 102/104 is illustrated in greater detail in FIG. 4 and is described in detail below with reference to that figure.

In some embodiments, the network 106 may comprise a telecommunication network of a telecommunication service provider that offers a plurality of telecommunication services to telecommunication devices 102/104, including video calling. The telecommunication network 106 may include the server 108 and a plurality of computing device connected, for example, by one or more wide area networks (WAN), one or more local area networks (LAN), and/or one or more personal area networks (PAN). Communication between these computing devices of the telecommunication network 106 may be wired, wireless, or both. These communications may utilize any sort of communication protocol known in the art for sending and receiving messages, such as the Transmission Control Protocol/Internet Protocol (TCP/IP), the Hypertext Transfer Protocol (HTTP), Extensible Messaging and Presence Protocol (XMPP), and/or the Session Initiation Protocol (SIP). Any one or more of these protocols may also be used to communicate with telecommunication devices 102/104 through base stations of the telecommunication network 106 or other access points and to further communicate with one or more other networks, such as WANs, LANs, PANs, or the Internet.

In some embodiments, base stations and access points of the network 106 may communication with the telecommunication devices 102/104 through any of a number of types of networks, including 1G networks, 2G networks, 3G networks, 4G networks, later generation networks, Wi-Fi networks, or Wi-Max networks, among others. As the telecommunication devices 102/104 move from location to location, they may access the network 106 through different base stations and access points offering different types of networks. For example, a first base station may offer a 4G network and a second base station may offer a 3G network. As a telecommunication device 102/104 moves from a cell of the first base station to a cell of the second base station, the telecommunication device 102/104 transitions from a 4G network connection to a 3G network connection. In one embodiment, the cell associated with the second base station may include a location associated with a WiFi network. In such an embodiment, when the telecommunication device 102/104 arrives at the location associated with the WiFi network, it may connect to the WiFi network in place of the 3G network.

While the server 108 is shown as a single computing device, the server 108 may be implemented in any one or more computing devices, such as PCs, laptop computers, workstations, server systems, mainframes, server farms, or any other computing devices. The computing device(s) constituting the server 108 may also be connected by one or more networks, such as WANs, LANs, PANs, or the Internet and may utilize any sort of communication protocol known in the art for sending and receiving messages, such as TCP/IP, HTTP, or any other protocol. Also, the video calling module 124, link quality determination module 126, rate adaptation module 128, and models 130 of the server 108 may be implemented in a single computing device or disturbed among multiple computing devices of the server 108. For example, one computing device of server 108 may implement the video calling module 124 and another may implement the link quality determination module 126, rate adaptation module 128, and models 130. An example server 108 is illustrated in greater detail in FIG. 5 and is described in detail below with reference to that figure.

In various embodiments, the first telecommunication device 102 and second telecommunication device 104 may establish a video call through and exchange of signaling messages. The module of the first and second telecommunication devices 102 and 104 responsible for exchanging these messages may, in some embodiments, be the video calling module 116. For example, if the first telecommunication device 102 initiates the video call, the video calling module 116 of the first telecommunication device 102 may send an invitation to engage in a video call to the second telecommunication device 104 through the server 108 or through some other device of the telecommunication service provider. The second telecommunication device 104 may then respond with an acknowledgment, establishing the control layer 114 between the first telecommunication device 102 and the second telecommunication device 104. Using the control layer 114, the first telecommunication device 102 and the second telecommunication device 104 may exchange further messages utilized to establish the video call. Once the video call is established, the first telecommunication device 102 transmits video and audio frames 110 to the second telecommunication device 104 at a first frame rate and the second telecommunication device 104 transmits video and audio frames 112 at a second frame rate.

In some embodiments, the video call is conditionally established based on network, device, or user features associated with of each of the first telecommunication device 102 and the second telecommunication device 104. Such network, device, or user features may include current network connection types, current network loads, device characteristics (e.g., whether the device has a front-facing camera), or user characteristics (e.g., whether the user is logged in). When the first telecommunication device 102 initiates the video call, the video calling module 116 of the first telecommunication device 102 may first determine the network, device, or user features of the first telecommunication device 102. For example, the video calling module 116 may determine if the first telecommunication device 102 is connected to a 3G network, a 4G network, a WiFi network, etc., whether the first telecommunication device 102 has a front-facing camera, and/or whether the user of the first telecommunication device 102 is logged in. In some embodiments, the video calling module 116 then initiates the video call based on the network, device, or user features, such as based on specific network types. In one embodiment, those one or more specific network types include 4G networks and WiFi networks. In such an embodiment, if the first telecommunication device 102 were connected to a 3G network, the video calling module 116 would not initiate the video call. Instead, the video calling module 116 may notify the user or an application of the first telecommunication device 102 that video calling is currently unavailable.

In one embodiment, prior to establishing the video call, the initiating telecommunication device 102/104 may receive a notification from the server 108 informing that telecommunication device 102/104 that a WiFi network is available at the location of the telecommunication device 102/104. The telecommunication device 102/104 may receive such an alert from the server 108 when the telecommunication device 102/104 is connected to a 3G network while at a location where a WiFi network is available. The alert may also inform the user of the telecommunication device 102/104 that connecting to the WiFi network will enable the user to engage in a video call.

In various embodiments, the video call between the first telecommunication device 102 and the second telecommunication device 104 may be a real-time conversation involving a real-time exchange of video and audio data transmitted in the video and audio frames 110 and 112. Video calling modules 116 may provide the video and audio data for rendering by the telecommunication device platforms or other applications as the video and audio data is received. In some embodiments, the video calling modules 116 may buffer received video and audio data, but the amount of data buffered is sufficiently small so as to not introduce delays in real-time playback of the video and audio data. In such embodiments, video and audio data buffered more than a threshold amount of time may be discarded.

In another embodiment, one or both of the telecommunication devices 102 and 104 engaged in the real-time video call may change locations during the video call, resulting in different network connection types or different network loads. For example, a telecommunication device 102/104 may move from a cell with 4G network availability to a cell with 3G network availability. In response to detecting a change of network connection type, the video calling module 116 of that moved telecommunication device 102/104 may drop the video call, inform the user of that telecommunication device 102/104 that the user must connect to a WiFi network or the call will be dropped, or transition from a video call to a voice call, instant message conversation, text message, or email.

In various embodiments, the link quality determination modules 118 of the first telecommunication device 102 and the second telecommunication device 104 may be configured to determine uplink and downlink link qualities for their respective telecommunication devices 102 and 104. Link quality refers to the capacity of a link—such as an uplink channel or downlink channel—for data throughput at a specific time. In some embodiments, link quality includes a measurement of signal strength and/or signal-to-noise ratios. An uplink link quality is the link quality of the uplink channel of the radio frequency spectrum that is used by telecommunication devices in transmitting data. A downlink link quality is the link quality of the downlink channel of the radio frequency spectrum that is used by telecommunication devices in receiving data. The link quality determination module 118 may determine uplink and downlink link qualities in response to events, such as the establishment of a video call, or may monitor uplink and downlink link qualities by periodically determining those link qualities. In some embodiments, the link quality determination module 118 may also monitor network connection type changes or receiving notifications of network connection type changes from the video calling module 116.

In various embodiments, the link quality determination module 118 of a telecommunication device 102/104 may determine predictions of uplink and downlink link qualities based on models 122. The models 122 may include historical data indicating locations of the telecommunication device 102/104 on specific days and times and link qualities at those locations on those dates and times. In one embodiment, the models 122 may also or instead event data. Based on these models 122 and either or both of the current date/time or the location of the telecommunication device 102/104, the link quality determination module 118 may predict uplink and downlink link qualities of the telecommunication device 102/104 as well as changes to those link qualities over a time period. These predictions may be used in place of the determined link qualities or may be used to modify the determined link qualities.

Responsive to determining a link quality change, a rate adaptation module 120 associated with the telecommunication device 102/104 that determined the change may be invoked to perform one or both of adapting a frame rate or requesting the other telecommunication device 102/104 to adapt its frame rate. In response to determining that the uplink link quality has changed, the rate adaptation module 120 adapts the frame rate at which its telecommunication device 102/104 transmits video and audio frames 110/112. In response to determining that the downlink link quality has changed, the rate adaptation module 120 requests that the other telecommunication device 102/104 adapt the frame rate at which it transmits video and audio frames 110/112 to the requesting telecommunication device 102/104.

In some embodiments, the degree of adaptation to the frame rate is directly proportional to the change in link quality. Such proportionality may be linear, exponential, logarithmic, or of another sort. Thus, an increase in link quality may result in the rate adaptation module 120 increasing the frame rate or requesting that the other telecommunication device 102/104 increase its frame rate. A decrease in link quality may result in the rate adaptation module 120 decreasing the frame rate or requesting that the other telecommunication device 102/104 decrease its frame rate. Also, the degree of adaptation may be based both on the link quality changes and on a range of frame rates utilized for real-time video calls. For example, if a link quality determination module 118 of a telecommunication device 102/104 determines that the uplink link quality has decreased and the downlink link quality has increased, the rate adaptation module 120 of that telecommunication device 102/104 may decrease the frame rate of the telecommunication device 102/104 and request that the other telecommunication device 102/104 increase its frame rate.

Also, in some embodiments, the rate adaptation module 120 transmits the requests to adapt frame rates over the control layer 114 between the first telecommunication device 102 and the second telecommunication device 104. Each request may include both an identification of itself as a request to adapt a frame rate and an indication of the downlink link quality of the requesting telecommunication device 102/104.

In various embodiments, the rate adaptation module 120 adapts the frame rate of its telecommunication device 102/104 based on both the uplink link quality of that telecommunication device 102/104 and on downlink link quality specified in a rate adaptation request received from the other of the telecommunication devices 102 and 104. The rate adaptation module 120 determines the lower of those two link qualities and adapts the frame rate based on the lower of the link qualities. For example, if the uplink link quality of the telecommunication device 102/104 is strong and the downlink link quality of the other telecommunication device 102/104 is weak, then the rate adaption module 120 adapts the frame rate based on the downlink link quality of the other telecommunication device 102/104.

In some embodiments, the rate adaptation module 120 of a telecommunication device 102/104 may adapt the frame rate of that telecommunication device 102/104 and request an adaptation to the frame rate of the other telecommunication device 102/104 responsive to a network connection type change. For example, if the telecommunication device 102/104 changes from a 4G network to a 3G network the rate adaptation module 120 of that telecommunication device 102/104 may decrease the frame rate of that telecommunication device 102/104 and request a decrease of the frame rate of the other telecommunication device 102/104. In other embodiments, as mentioned above, the telecommunication device 102/104 may instead drop to video call or transition to a voice call or other communication medium responsive to such a network connection type change.

In one embodiment, rather than receiving indications of link qualities from the link quality determination modules 118, the rate adaption modules 120 of the telecommunication devices 102/104 receive instructions from the server 108 to adapt their frame rates. The rate adaptation module 120 may then adapt their frame rates in accordance with the received instructions.

In various embodiments, as mentioned above, the server 108 may also participate in establishing video calls between telecommunication devices 102 and 104. The video calling module 124 of the server 108 may receive a signaling message 132 from a telecommunication device 102/104 initiating a video call and may conditionally provide the signaling message 132 to the called telecommunication device 102/104. The video calling module 124 may conditionally provide the signaling message based on network, device, or user features of one or both of the parties to the video call. For example, if either of the telecommunication devices 102 and 104 is connected to a network other than a 4G network or a WiFi network, the video calling module 124 may drop the video call. In other embodiments, the video calling module 124 may establish the call but adapt frame rates of one or both of the telecommunication devices 102 and 104 based on the network, device, or user features.

In some embodiments, the video calling module 124 or other module of the server 108 may periodically determine whether a telecommunication device 102/104 is connected to a network other than WiFi but is at a location where WiFi connectivity is available. In one embodiment, the video calling module 124 or other module may determine locations with WiFi connectivity based on the models 130, which may indicate locations where telecommunication devices 102 and 104 have previously connected to the network 106 via a WiFi network. Responsive to determining WiFi availability, the video calling module 124 or other module may alert the telecommunication device 102/104 that WiFi connectivity is available and that connection to the WiFi network would enable participation in video calling. In a further embodiment, this alert may be sent by the video calling module 124 or other module responsive to a signaling message 132 from a telecommunication device 102/104 that would like to engage in a video call with the telecommunication device 102/104 not currently connected to WiFi. In such an embodiment, the alert may also mention the identity of the calling telecommunication device 102/104, stating that connection to a WiFi network will enable a video call with that calling telecommunication device 102/104.

During the video call, the server 108 may pass video and audio frames 132 from each telecommunication device 102/104 to the other. Throughout the video call, the video calling module 124 may monitor the network connection types of the telecommunication devices 102 and 104, which may change throughout the video call. In response to detecting a change to a network other than a 4G network or a WiFi network, the video calling module 124 may drop the video call. In other embodiments, the video calling module 124 may adapt frame rates of one or both of the telecommunication devices 102 and 104 based on the network connection type(s).

In various embodiments, the link quality determination module 126 of the server 108 determines uplink and downlink link qualities of the telecommunication devices 102 and 104. The link quality determination module 126 may perform this determination based on events, such as the establishing of a video call, or may perform the determination periodically. In one embodiment, determining the uplink and downlink link qualities of the telecommunication devices 102 and 104 may simply involve receiving indications of those link qualities from the telecommunication devices 102 and 104.

In various embodiments, the link quality determination module 126 may determine predictions of uplink and downlink link qualities based on models 130. The models 130 may include historical data indicating locations of the telecommunication devices 102 and 104 on specific days and times and link qualities at those locations on those dates and times. In one embodiment, the models 130 may also or instead event data. Based on these models 130 and either or both of the current date/time or the location of the telecommunication devices 102 and 104, the link quality determination module 126 may predict uplink and downlink link qualities of the telecommunication devices 102 and 104 as well as changes to those link qualities over a time period. These predictions may be used in place of the determined link qualities or may be used to modify the determined link qualities.

Responsive to determining changes to link qualities or changes in network connection types, the rate adaptation module 128 may adapt frame rates of one or both of the telecommunication devices 102 and 104. As described above, such an adaptation of a frame rate may be directly proportional to the degree of link quality change. As also mentioned, the degree of adaptation may be based both on the link quality changes and on a range of frame rates utilized for real-time video calls. The rate adaptation module 128 may adapt the frame rate of the first telecommunication device 102 based on the lower of the uplink link quality for the first telecommunication device 102 and the downlink link quality for the second telecommunication device 104. The rate adaptation module 128 may also adapt the frame rate of the second telecommunication device 104 based on the lower of the uplink link quality for the second telecommunication device 104 and the downlink link quality for the first telecommunication device 102.

The rate adaptation module 128 may perform the adaptations in any of a number of ways. In some embodiments, the rate adaptation module 128 may instruct the telecommunication devices 102 and 104 to adapt their frame rates, indicating the type of adaptation (increase or decrease of frame rate) and the degree of adaptation in the instructions. In other embodiments, the server 108 may act as an intermediary, receiving and transmitting the video and audio frames 132 exchanged between the telecommunication devices 102 and 104. In such an embodiment, the rate adaptation module 128 may drop n out of every m video and audio frames 110/112 it receives and transmits, n being less than m. The size of n may be determined by the rate adaptation module 128 based on the degree of adaptation sought.

Example Operations

Figure 2:
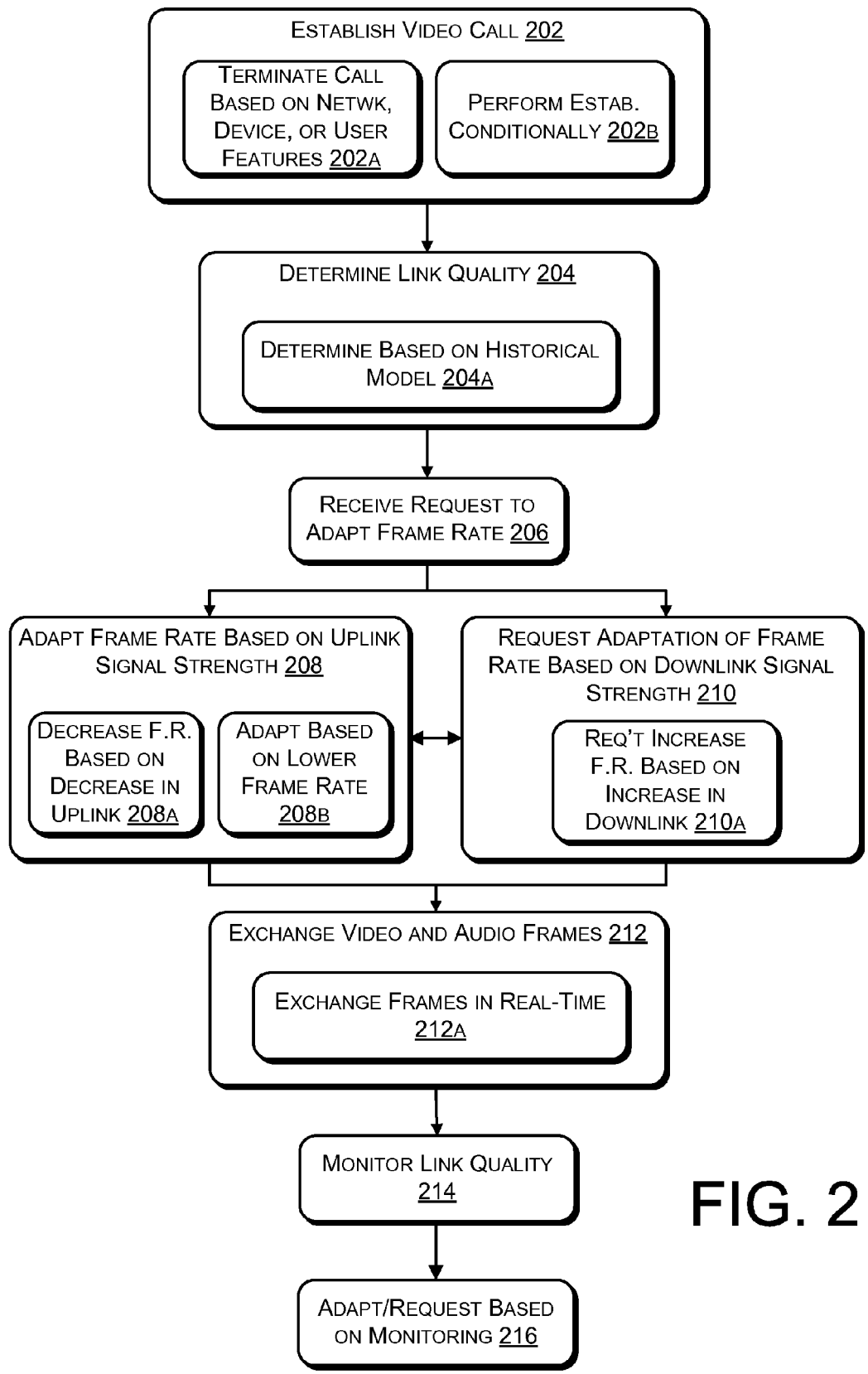
FIG. 2 illustrates a flowchart showing an example telecommunication-device-implemented method of adapting frame rates of a video call based on link qualities, in accordance with various embodiments.

FIG. 2 illustrates a flowchart showing an example telecommunication-device-implemented method of adapting frame rates of a video call based on link qualities, in accordance with various embodiments. As shown at block 202, a telecommunication device, such as first telecommunication device 102, establishes a video call with another telecommunication device, such as second telecommunication device 104. The two telecommunication devices may establish the video call in response one of the telecommunication devices initiating a video call with the other. At block 202a, the call from the initiating telecommunication device may be terminated by the telecommunication service provider if the called telecommunication device is not connected to one of a number of specified network types, such as 4G networks or WiFi networks. If the called telecommunication device is connected to another network type, such as a 2G or 3G network, the telecommunication provider may terminate the call. In some embodiments, after the video call is established, one of the telecommunication devices may switch network types, such as a connection from a 4G network to a 3G network. In response, the video call may be terminated or the rate at which frames are transmitted may be adapted, as described below. At block 202b, the establishing of the video call may be performed conditionally based on whether one or both of the telecommunication devices are connected to 4G networks or WiFi networks. Thus, if a user of a telecommunication device is not connected to a WiFi or 4G network, the telecommunication device of the user may not even present the user with an option to initiate a video call.

At block 204, each telecommunication device may determine its uplink link quality and downlink link quality via the telecommunication device platform, which may expose these link qualities. At block 204a, each telecommunication device may also or instead determine the link qualities based on a historical model associated with the telecommunication device. The historical model may include link qualities associated with locations where a user of the calling telecommunication device is at on specific days and times. Used in conjunction with a system time and, optionally, a location, each telecommunication device may predict current and future uplink link qualities and downlink link qualities.

At block 206, either before, during, or after determining link qualities, one or both of the telecommunication devices may receive a request from the other of the telecommunication devices requesting adaptation of the frame rate at which the telecommunication device(s) transmit video and audio frames of the video call.

At block 208, each telecommunication device may adapt the frame rate at which the telecommunication device transmits video and audio frames of the video call. For example, at block 208a, if the telecommunication device determines that the uplink link quality has decreased, the telecommunication device may decrease the frame rate based on that decrease of uplink link quality. At block 208b, each telecommunication device may adapt the frame rate based on the lower of its uplink link quality and a downlink link quality of the other telecommunication device, that downlink link quality being specified in a request received at block 206.

At block 210, each telecommunication device may also or instead request that the other telecommunication device adapt the frame rate at which the other telecommunication device transmits video and audio frames of the video call. The request may specify the downlink link quality of the telecommunication device making the request to enable the other telecommunication device to adapt its frame rate based on the specified downlink link quality. For example, at block 210a, if the requesting telecommunication device determines that its downlink link quality has increased, the telecommunication device may request that the other telecommunication device increase its frame rate.

At block 212, the telecommunication devices may exchange video and audio frames of the video call in accordance with the adapted frame rates. As noted at block 212a, the frames may be exchanged in real-time, with video and audio frames buffered more than a threshold amount of time being discarded.

At block 214, each telecommunication device may periodically monitor its uplink and downlink link qualities and, at block 216, perform at least one of the adapting of block 208 or the requesting of block 210 responsive to changes in the uplink and downlink link qualities.

Figure 3:
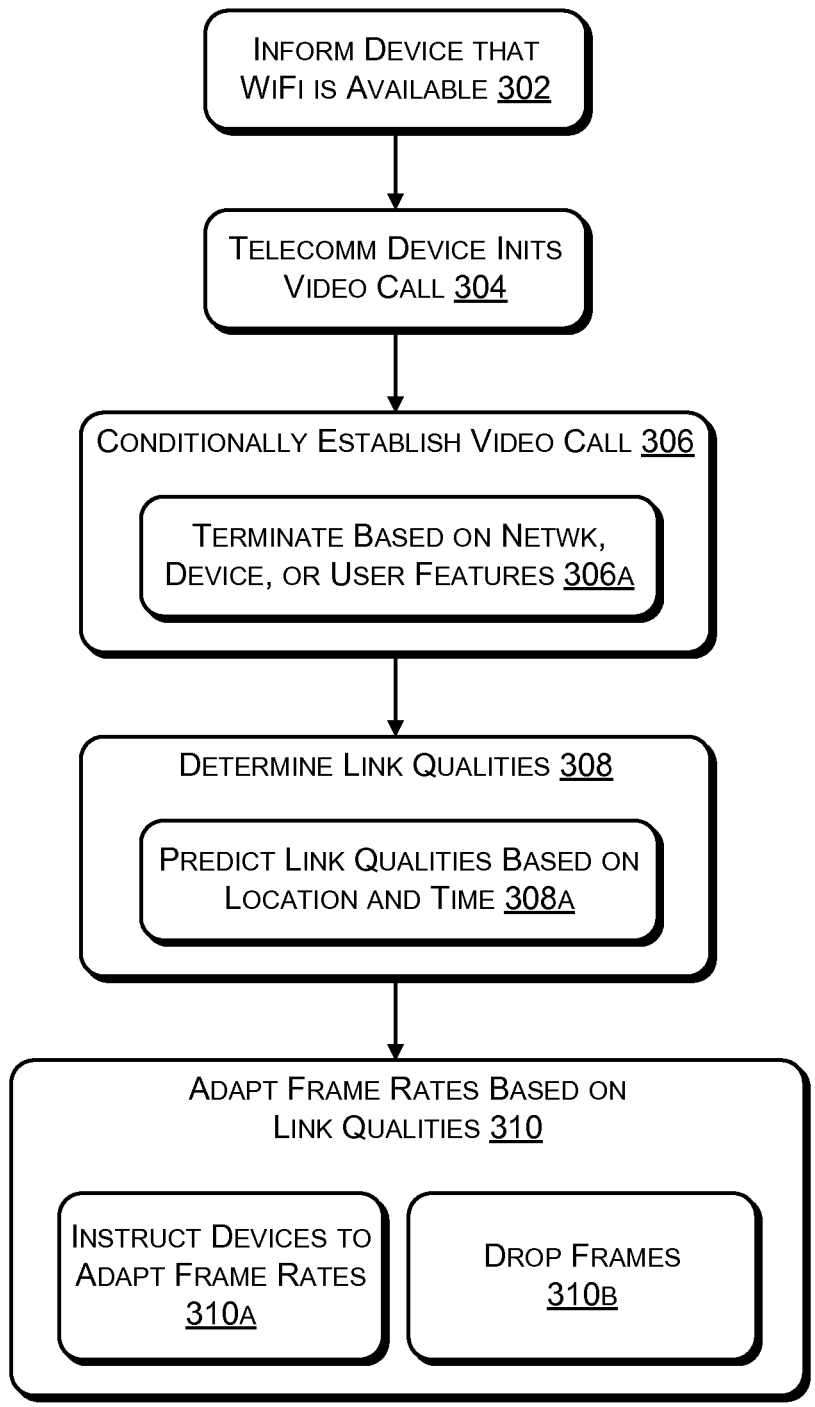
FIG. 3 illustrates a flowchart showing an example server-implemented method of adapting frame rates of a video call based on link qualities, in accordance with various embodiments.

FIG. 3 illustrates a flowchart showing an example server-implemented method of adapting frame rates of a video call based on link qualities, in accordance with various embodiments. At block 302, a server of a telecommunication service provider may inform one of its subscribers that WiFi connectivity is available. The subscriber and her telecommunication device may be at a location where WiFi is known to be available but may only, for example, be connected to a 3G network. Upon detecting these circumstances, the server may inform the subscriber via an alert or other message provided through the telecommunication device of the availability of WiFi. The server may also inform the subscriber that a WiFi connection would enable the subscriber to engage in video calling. In one embodiment, this alert may be provided responsive to a request from another subscriber that desires to video call the subscriber with WiFi availability.

At block 304, the server receives an initiation of a video call from a telecommunication device, which may be the same device that received the above mentioned alert or another telecommunication device. At block 306, responsive to the initiation, the server conditionally establishes a video call between the telecommunication device initiating the video call and another telecommunication device specified as the called party based on network connection types of these telecommunication devices. At block 306a, the server may terminate the video call if either or both devices are not connected to 4G or WiFi networks. The server may then act as an intermediary, communicating video and audio frames from each of the telecommunication devices to the other.

At block 308, the server determines the link qualities of the telecommunication devices that are party to the established video call. These link qualities may include the uplink and downlink link qualities of each device. At block 308a, the determining of the link qualities comprises predicting the signals strengths based on locations of one or both of the telecommunication devices.

At block 310, the server adapts a frame rate of at least one of the telecommunication devices based on the determined link qualities, the frame rate being a rate at which each telecommunication device transmits the video and audio frames of the video call. The server may adapt the frame rate of each telecommunication device based on the lower of an uplink link quality of that telecommunication device and a downlink link quality of the other telecommunication device. At block 310a, the server may adapt frame rates by instructing one or both of the telecommunication devices to adapt their frame rates. Alternatively, at block 310b, the server may adapt frame rates by dropping n video and audio frames out of every m video and audio frames received from each telecommunication device, wherein n is less than m.

Example Systems

Figure 4:
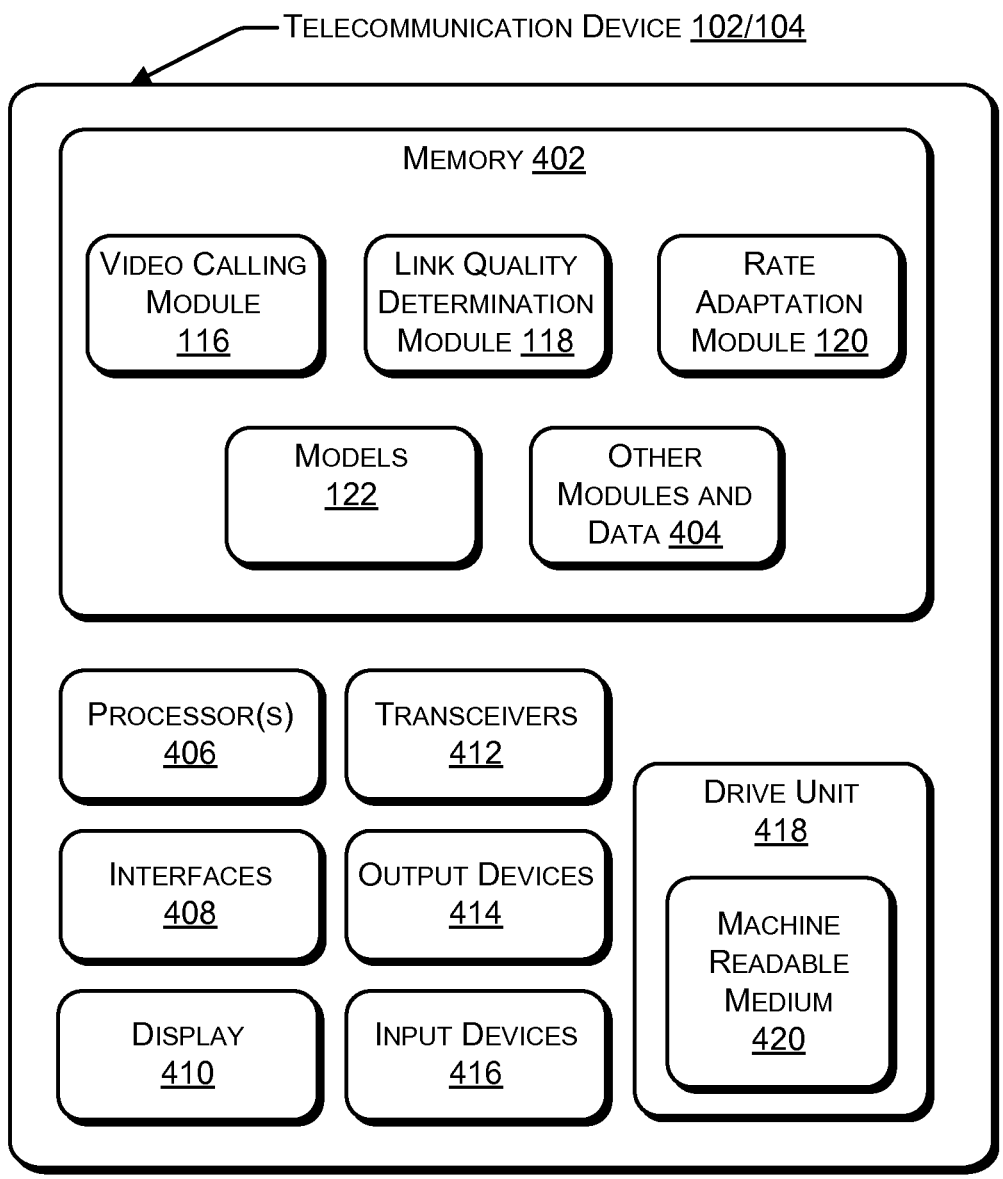
FIG. 4 illustrates an example telecommunication device system architecture, in accordance with various embodiments.

FIG. 4 illustrates an example telecommunication device system architecture, such as a system architecture of one or both of the first telecommunication device 102 or the second telecommunication device 104, in accordance with various embodiments. As shown, the first telecommunication device 102 or the second telecommunication device 104 may include a memory 402, the memory storing the video calling module 116, the link quality determination module 118, the rate adaptation module 120, the models 122, and other modules and data 404. The first telecommunication device 102 or the second telecommunication device 104 may also include processor(s) 406, interfaces 408, a display 410, transceivers 412, output devices 414, input devices 416, and drive unit 418 including a machine readable medium 420.

In various embodiments, memory 402 generally includes both volatile memory and non-volatile memory (e.g., RAM, ROM, EEPROM, Flash Memory, miniature hard drive, memory card, optical storage, magnetic cassettes, magnetic tape, magnetic disk storage or other magnetic storage devices, or any other medium). Additionally, in some embodiments, memory 402 includes a SIM (subscriber identity module) card, which is a removable memory card used to identify a user of the first telecommunication device 102 or the second telecommunication device 104 to a telecommunication network, such as network 106. Memory 402 can also be described as computer storage media and may include volatile and nonvolatile, removable and non-removable media implemented in any method or technology for storage of information, such as computer readable instructions, data structures, program modules, or other data.

The video calling module 116, the link quality determination module 118, the rate adaptation module 120, and the models 122, shown as stored in memory 402, are described in greater detail above. The other modules and data 404 may be utilized by the first telecommunication device 102 or the second telecommunication device 104 to perform or enable performing any action taken by the first telecommunication device 102 or the second telecommunication device 104. The other modules and data 404 may include a telecommunication device platform and applications, and data utilized by the platform and applications.

In some embodiments, the processor(s) 406 is a central processing unit (CPU), a graphics processing unit (GPU), or both CPU and GPU, or any other sort of processing unit.

In various embodiments, the interfaces 408 are any sort of interfaces. Interfaces 408 include any one or more of a wireless LAN interface, or a near field interface. The a wireless LAN interface can include a Wi-Fi interface or a Wi-Max interface, or a Bluetooth® interface that performs the function of transmitting and receiving wireless communications using, for example, the IEEE 802.11, 802.16 and/or 802.20 standards. For instance, the first telecommunication device 102 or the second telecommunication device 104 can use a Wi-Fi interface to communicate directly with a nearby device. The near field interface can include a Bluetooth® interface or RFID for transmitting and receiving near field radio communications via a near field antenna. For example, the near field interface may be used for functions, as is known in the art, such as communicating directly with nearby devices that are also, for instance, Bluetooth® or RFID enabled. A reader/interrogator may be incorporated into the first telecommunication device 102 or the second telecommunication device 104.

In various embodiments, the display 410 is a liquid crystal display or any other type of display commonly used in telecommunication devices. For example, display 410 may be a touch-sensitive display screen, and can then also act as an input device or keypad, such as for providing a soft-key keyboard, navigation buttons, or the like.

In some embodiments, the transceivers 412 include any sort of transceivers known in the art. For example, transceivers 412 may include a radio transceiver and interface that performs the function of transmitting and receiving radio frequency communications via an antenna. Such communications may include the transmitting and receiving the video and audio frames 110/112 of the video call over radio frequencies associated with uplink and downlink communications. The radio interface facilitates wireless connectivity between the first telecommunication device 102 or the second telecommunication device 104 and various cell towers, base stations and/or access points.

In some embodiments, the output devices 414 include any sort of output devices known in the art, such as a display (already described as display 410), speakers, a vibrating mechanism, or a tactile feedback mechanism. Output devices 414 also include ports for one or more peripheral devices, such as headphones, peripheral speakers, or a peripheral display.

In various embodiments, input devices 416 include any sort of input devices known in the art. For example, input devices 416 may include a microphone, a keyboard/keypad, or a touch-sensitive display (such as the touch-sensitive display screen described above). A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like. As mentioned above, the telecommunication devices 102 and 104 may also each include a front-facing camera or port for an attachment to a peripheral camera. Front-facing cameras and peripheral cameras are also examples of input devices 416.

The machine readable medium 420 stores one or more sets of instructions (e.g., software) embodying any one or more of the methodologies or functions described herein. The instructions may also reside, completely or at least partially, within the memory 402 and within the processor(s) 406 during execution thereof by the first telecommunication device 102 or the second telecommunication device 104. The memory 402 and the processor(s) 406 also may constitute machine readable media 420.

Figure 5:
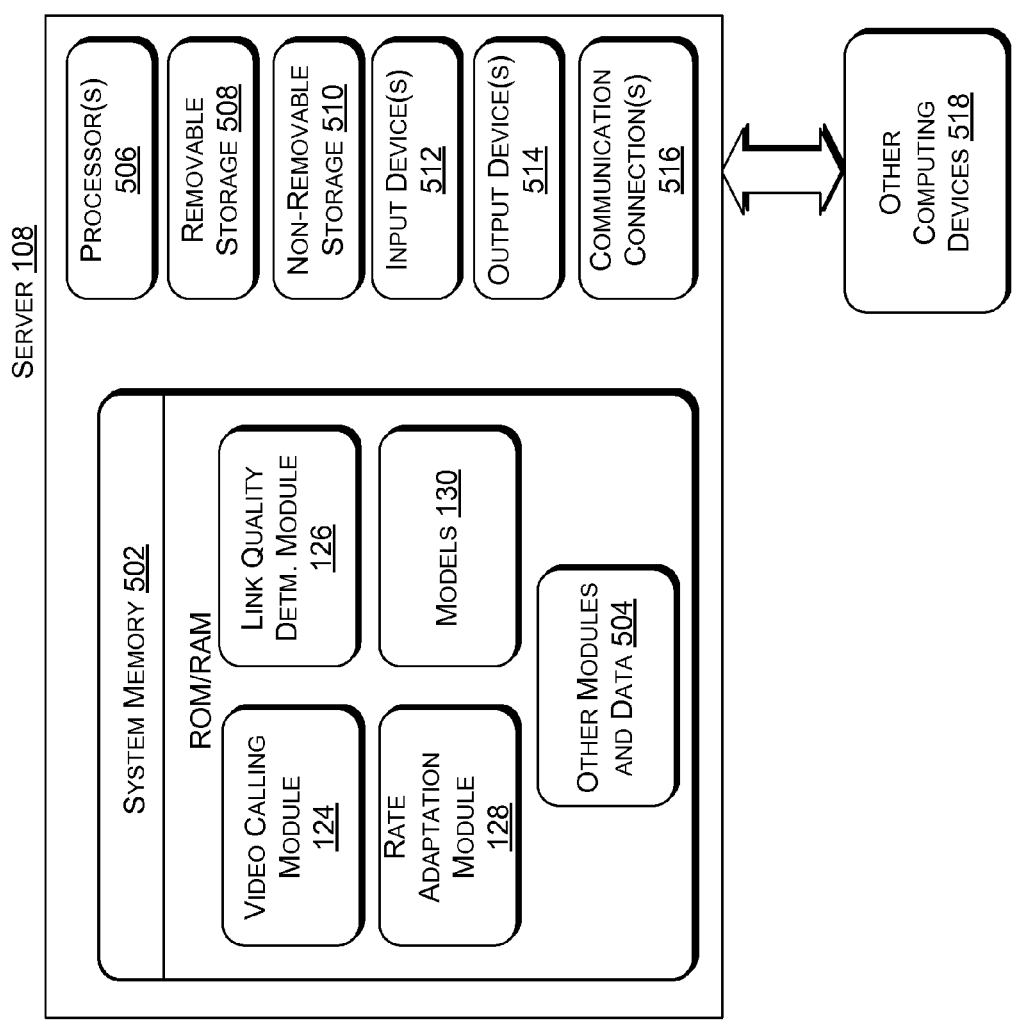
FIG. 5 illustrates an example computing device system architecture, in accordance with various embodiments.

FIG. 5 illustrates an example computing device system architecture, such as a system architecture of the server 108 of the telecommunication service provider, in accordance with various embodiments. As illustrated, the server 108 comprises a system memory 502. The system memory 502 may store the video calling module 124, the link quality determination module 126, the rate adaptation module 128, the models 130, and other modules and data 704. Also, the server 108 includes processor(s) 506, a removable storage 508 and non-removable storage 510, input device(s) 512, output device(s) 514, and communication connections 516 for communicating with other computing devices 518.

In various embodiments, system memory 502 is volatile (such as RAM), non-volatile (such as ROM, flash memory, etc.) or some combination of the two. Example system memory 502 may include one or more of RAM, ROM, EEPROM, a Flash Memory, a miniature hard drive, a memory card, an optical storage, a magnetic cassette, a magnetic tape, a magnetic disk storage or another magnetic storage device, or any other medium.

The video calling module 124, the link quality determination module 126, the rate adaptation module 128, and the models 130, shown as stored in memory 502, are described in greater detail above. While the video calling module 124, the link quality determination module 126, the rate adaptation module 128, and the models 130 are shown in FIG. 5 as being stored on a single server 108, they may be stored across multiple computing devices of the cloud service, each computing device implementing one of the video calling module 124, the link quality determination module 126, the rate adaptation module 128, and the models 130, all of the video calling module 124, the link quality determination module 126, the rate adaptation module 128, and the models 130, or parts of one or more of the video calling module 124, the link quality determination module 126, the rate adaptation module 128, and the models 130. The other modules and data 504 may be utilized by the server 108 to perform or enable performing any action taken by the server 108. The other modules and data 504 may include a platform and applications, and data utilized by the platform and applications.

In some embodiments, the processor(s) 506 is a central processing unit (CPU), a graphics processing unit (GPU), or both CPU and GPU, or other processing unit or component known in the art.

Server 108 also includes additional data storage devices (removable and/or non-removable) such as, for example, magnetic disks, optical disks, or tape. Such additional storage is illustrated in FIG. 5 by removable storage 508 and non-removable storage 510. Computer storage media may include volatile and nonvolatile, removable and non-removable media implemented in any method or technology for storage of information, such as computer readable instructions, data structures, program modules, or other data. System memory 502, removable storage 508 and non-removable storage 510 are all examples of computer-readable storage media. Computer-readable storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the server 108. Any such computer-readable storage media may be part of the server 108.

In various embodiment, any or all of system memory 502, removable storage 508, and non-removable storage 510, store programming instructions which, when executed, implement some or all of the above-described operations of the server 108.

Server 108 also has input device(s) 512, such as a keyboard, a mouse, a touch-sensitive display, voice input device, etc., and output device(s) 514 such as a display, speakers, a printer, etc. These devices are well known in the art and need not be discussed at length here.

Server 108 also contains communication connections 516 that allow the server 108 to communicate with other computing devices 518, such as the first telecommunication device 102 and second telecommunication device 104.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

We claim:

1. A method comprising:
    establishing, by a first telecommunication device, a video call with a second telecommunication device;
    determining, by the first telecommunication device, uplink and downlink link qualities of the first telecommunication device;
    receiving, from the second telecommunication device, a request for an adaptation to a first frame rate at which the first telecommunication device transmits video and audio frames of the video call, the request for the adaptation of the first frame rate specifying a downlink link quality of the second telecommunication device;
    requesting that the second telecommunication device adapt a second frame rate at which the second telecommunication device transmits video and audio frames of the video call based at least on the downlink link quality; and
    adapting the first frame rate based on the lower of the uplink link quality of the first telecommunication device and the downlink link quality of the second telecommunication device.

2. The method of claim 1, wherein the determining is based on a historical model associated with the first telecommunication device.

3. The method of claim 2, wherein the historical model includes link qualities associated with locations where a user of the first telecommunication device or a user of the second communication device is at on specific days and times.

4. The method of claim 1, wherein the adapting comprises decreasing the first frame rate in response to a decrease in uplink link quality.

5. The method of claim 1, further comprising, in response to determining a weak uplink link quality and a strong downlink link quality, decreasing the first frame rate and requesting an increase of the second frame rate.

6. The method of claim 1, further comprising periodically monitoring the uplink and downlink link qualities and performing at least one of the adapting or the requesting responsive to changes in the uplink or downlink link qualities.

7. The method of claim 1, further comprising determining that a network, device, or user feature of one of the first or second telecommunication devices has changed and, in response, terminating the video call.

8. The method of claim 1, wherein the establishing of the video call is performed conditionally based at least on whether the first and second telecommunication devices are connected to 4G networks or WiFi networks.

9. The method of claim 1, further comprising exchanging video and audio frames in accordance with the first frame rate and the second frame rate.

10. The method of claim 9, wherein the exchanging is performed in real-time, with video and audio frames buffered more than a threshold amount of time being discarded.

11. One or more non-transitory computer storage media comprising computer-executable instructions stored thereon which, when executed by a server device of a telecommunications service provider, perform operations including:
    conditionally establishing a video call between a first telecommunication device and a second telecommunication device based on network, device, or user features of the first and second telecommunication devices;
    determining link qualities associated with each of the first and second telecommunication devices;
    adapting a frame rate of at least one of the first and second telecommunication devices based on the determined link qualities, the frame rate being a rate at which the first or second telecommunication device transmits video and audio frames of the video call; and
    terminating the video call when the second telecommunication device is not connected to a 4G network or a WiFi network or when a network load exceeds a threshold.

12. The one or more non-transitory computer storage media of claim 11, wherein the link qualities include one or both of uplink link qualities or downlink link qualities.

13. The one or more non-transitory computer storage media of claim 11, wherein the operations further include determining that a telecommunication device has a WiFi network available but is not connected to the WiFi network and informing the telecommunication device that connection to the WiFi network will enable the telecommunication device to engage in video calls.

14. The one or more non-transitory computer storage media of claim 11, wherein the determining of the link qualities comprises predicting the signals strengths based on locations of one or both of the first and second telecommunication devices.

15. The one or more non-transitory computer storage media of claim 11, wherein adapting the frame rates further comprises:
  adapting the frame rate of the first telecommunication device based on the lower of an uplink link quality of the first telecommunication device and a downlink link quality of the second telecommunication device; and
  adapting the frame rate of the second telecommunication device based on the lower of an uplink link quality of the second telecommunication device and a downlink link quality of the first telecommunication device.

16. The one or more non-transitory computer storage media of claim 11, wherein adapting the frame rates further comprises one of:
  instructing one or both of the first and second telecommunication devices to adapt their frame rates; or
  dropping n video and audio frames out of every m video and audio frames received from the first or second telecommunication device, wherein n is less than m.

17. A telecommunication device comprising:
  a processor;
  a video calling module configured to be operated by the processor to establish a video call with another telecommunication device and exchange video and audio frames with the other telecommunication device and render those video and audio frames in real-time; and
  a rate adaptation module configured to be operated by the processor to:
    determine uplink and downlink link qualities of the telecommunication device;
    receiving, from the other telecommunication device, a request for an adaptation to a first frame rate at which the telecommunication device transmits video and audio frames of the video call, the request for the adaptation of the first frame rate specifying a downlink link quality of the other telecommunication device;
    requesting that the other telecommunication device adapt a second frame rate at which the other telecommunication device transmits video and audio frames of the video call based at least on the downlink link quality; and
    adapting the first frame rate based on the lower of the uplink link quality of the first telecommunication device and the downlink link quality of the second telecommunication device.

18. The system of claim 17, wherein the rate adaptation module transmits requests to the other telecommunication device and receives requests from the other telecommunication device by utilizing a control layer associated with the video call.

* * * * *